3,411,927
PROCESSING OF ASPHALT AND LIGHTWEIGHT AGGREGATE COMPOSITION
Joseph John Brouk, Ladue, Mo. (% J. J. Brouk & Company, 1367 S. Kingshighway Blvd., St. Louis, Mo. 63110)
No Drawing. Filed Apr. 6, 1964, Ser. No. 357,740
12 Claims. (Cl. 106—281)

This invention relates generally to improvements in the method of making a composition that is especially adapted for application as an insulating pad for roofs, floors, underground pipes, and the like, and especially adapted for use in plaster and concrete, and more particularly to the improved processing of a lightweight aggregate and asphalt mix for such purposes.

Heretofore, asphalt was mixed with the aggregate, such as perlite, in the field at the job site, and the mix was heated to the appropriate temperature so that the mix could be applied as an insulating pad or other surface. Of course, this procedure was time-consuming and resulted in increased costs.

It is a major object of the present invention to process the lightweight aggregate and asphalt at the plant as the aggregate comes directly from the expanding kiln so that the hot mix can be transported to the job site for immediate application in such state, all without any further treatment.

An important objective is achieved in making the composition by mixing hot asphalt with hot, lightweight aggregate, and then adding a controlled amount of water at this stage to the mixture to cool the mix to a temperature at which it can be conveyed, bagged or otherwise transported to the job, and then immediately and directly placed and rolled or tamped to provide the pad or surface. The water is substantially evaporated by the heat of the mix, and does not adversely affect the coating of the asphalt on the aggregate or the bonding or compaction of the mix by rolling.

Another important objective is realized in that the mixing of hot asphalt to a hot lightweight aggregate, such as perlite, affords a better coating on the perlite than that realized if the aggregate were cold. Moreover, the addition of a small, controlled amount of water at this specific stage of the process to the mixture of hot asphalt and hot aggregate prevents caking of the material, prevents calcination or spontaneous combustion in the mixture and enables the mixture to be bagged and transported hot from the plant to the job without any fire hazard, tends to fix the asphalt coating on the aggregate, and permits transportation of the hot composition in bulk.

Moreover, the specific steps of processing provides a composition that reduces the amount of water content required when the composition is used as the aggregate for plaster or concrete. Furthermore, the resultant mix tends to reduce the tendency of the composition aggregate, such as perlite, to rehydrate and expand upon the addition of water to form such products.

Still another important object is afforded by using any lightweight aggregate weighing from about two (2) to fifteen (15) lbs. per cubic foot. This type of aggregate includes an expanded volcanic glass rock, such as perlite, or an expanded micaceous material, such as vermiculite.

An important object is attained by mixing hot asphalt to hot lightweight aggregate that is of a temperature of about 100 to 250 degrees F., and by adding water to the mixture to provide a composition of desired temperature.

Another important object is provided in that the hot asphalt mixed with the aggregate is of a temperature about 350 to 450 degrees F., and that the small amount of water is added to this mixture for the purposes and advantages mentioned previously.

Yet another important object is achieved by mixing hot asphalt to the hot aggregate so that the resultant mix is of a temperature about 250 to 350 degrees F., the water acting to reduce this temperature further to a value that enables the composition to be transported and used immediately.

An important object is realized by mixing hot asphalt at a temperature of about 350 to 450 degrees F. with hot lightweight aggregate at a temperature of about 100 to 250 degrees F., and by adding sufficient water to this mixture to cool it to a hot mix temperature of about 100 to 230 degrees F., at which temperature the composition can be applied as a hot mix.

An important objective is afforded by mixing about twenty (20) to fifty (50) percent by weight of asphalt to about forty (40) to seventy-eight (78) percent by weight of hot lightweight aggregate, and then adding about two (2) to twenty (20) percent by weight of water to cool the mixture to a temperature at which the composition can be transported from the plant to the job and used. It has been found that a preferred composition is formed by mixing about forty-two (42) percent by weight of hot asphalt, about fifty-one (51) percent by weight of hot aggregate and about seven (7) percent by weight of water.

As stated previously, the lightweight aggregate utilized in the composition may range in weight from two (2) to fifteen (15) lbs. per cubic foot. This lightweight aggregate includes such material as expanded perlite and vermiculite.

For purposes of illustration, perlite will be considered the lightweight aggregate, but it will be understood that the temperature ranges, rates of feed and other conditions stated in the example of the process apply as well to other lightweight aggregates.

It will be assumed that the perlite comes out of the perlite expanding kiln at the plant at a temperature of about 150 to 250 degrees F. If for some reason, the perlite aggregate has cooled, it would be necessary to reheat the expanded perlite by suitable means to a somewhat lower temperature of 100 to 200 degrees F. The hot perlite is therefore at a temperature of about 100 to 250 degrees F., and is then introduced into a continuous screw conveyor or auger that may have a heat jacket to maintain the perlite at the desired high temperature. The screw conveyor may be from six (6) to twenty (20) feet long. The hot perlite is introduced into the screw conveyor at a predetermined rate, as for example, four (4) cubic feet or approximately thirty (30) lbs. per minute.

Also introduced into the continuous screw conveyor with the hot perlite is a hot asphalt that is at a temperature of substantially 350 to 450 degrees F. This hot asphalt is introduced at the rate of about three (3) gallons or twenty-five (25)–twenty-six (26) lbs. per minute. The hot asphalt coats the hot perlite effectively and affords a resultant mixture that has a temperature of substantially 250 to 350 degrees F.

The asphalt utilized in this mixe has the following range of specifications: A softening point at 150 to 250 degrees F. (ASTM D36), a penetration at 77 degrees F. of 20 to 300 (ASTM D5) and a flash point (C.O.C.) of 350 to 525 degrees F. (ASTM D92).

As the mixture of hot perlite and hot asphalt travels along the screw conveyor, a small, controlled amount of water, such as one-half (½) gallon or four (4) lbs. per minute is added. The addition of water at this specific stage of the process conditions the mix, prevents caking, and cools the de-agglomerated mix from a temperature of substantially 250 to 350 degrees F. to substantially 100 to 230 degrees F. In this state, the hot mix can be conveyed, bagged, and/or transported, placed and rolled or tamped to form the pad or surface.

Under some circumstances, a silicone solution may be added to the water that is mixed with the hot perlite and hot asphalt. This silicone solution will adhere to the perlite aggregate and reduce the adsorptive characteristic of such aggregate.

Of course, the amounts of ingredients in the composition may vary and still obtain a workable and useful product that realizes all of the advantages and functional results. For example, hot asphalt within the range of substantially twenty to fifty per cent (20–50%) by weight can be added to the expanded perlite which is within a range of forty to seventy eight percent (40–78%) by weight, while the amount of water can be within the range of two to twenty percent (2–20%) by weight.

Generally, the composition is made by mixing twenty to fifty per cent (20–50%) by weight of hot asphalt that is at a temperature of substantially 350 to 500 degrees F. with forty to seventy eight percent (40–78%) by weight of hot aggregate that is at a temperature of substantially 100 to 250 degrees F., and by adding two to twenty percent (2–20%) by weight of water to such mixture so as to reduce the temperature of the mixture from a temperature of substantially 250 to 350 degrees F. to a value of substantially 100 to 230 degrees F. The aggregate utilized may range in weight from two (2) to fifteen (15) lbs. per cubic foot.

To illustrate a specific example, the asphalt utilized has a softening point of from 190 to 200 degrees F. (ASTM D36), a penetration at 77 degrees F. of 25 to 35 (ASTM D5) and a flash point (C.O.C.) of substantially 500 degrees F. (ASTM D92). The aggregate may range in weight from five (5) to eight (8) lbs. per cubic foot. The preferred size of the aggregate is determined by a series of screens of standard mesh sizes utilized in the construction field. For example, 4-mesh is one having four (4) openings per square inch. In screening the aggregate, 0% is retained on top of 4-mesh, zero to fifteen percent (0–15%) is retained on 8-mesh, forty to eighty percent (40–80%) is retained on 16-mesh, sixty five to ninety five percent (65–95%) is retained on 30-mesh, eighty to ninety six percent (80–96%) is retained on 50-mesh, and ninety to one hundred (90–100%) is retained on 100-mesh. It will be understood that the percentages listed are cumulative.

In this specific example, the composition is made by mixing substantially forty two percent (42%) by weight of hot asphalt at a temperature of substantially 350 to 450 degrees F. to substantially fifty one percent (51%) by weight of hot aggregate that is at a temperature of substantially 100 to 250 degrees F., and then adding substantially five percent (5%) by weight of water to the mixture to bring the temperature of the mixture down from substantially 250 to 350 degrees F. to a value of 100 to 230 degrees F.

In the general and the specific examples stated above, expanded perlite may be used for the hot lightweight aggregate. Vermiculite may also be used, as well as any other qualifying lightweight aggregate.

With this process of mixing hot asphalt to hot lightweight aggregate, such as perlite, as it emerges from the furnace, and then adding a small, controlled amount of water to bring the temperature of the mix to a desired value, the composition can be bagged and transported in bags or in bulk from the plant to the job site where the composition can be applied in such state to provide an insulating pad or surface without any further treatment, or the composition can be used as the aggregate in the formation of plaster or concrete.

At the time of such application as a pad or surface on the job, there is very little, if any, residue of water left in the composition because such water will have been evaporated by the heat of such composition.

The addition of water at the particular stage in the process of mixing the hot perlite and hot asphalt produces a composition in which there is a more effective asphalt coating of the aggregate, prevents calcination or spontaneous combustion in the mixture and thereby enables the mixture to be bagged and transported hot from the plant to the job without any fire hazard, prevents caking of the material, tends to fix the asphalt coating on the aggregate, and permits transportation of the de-agglomerated hot composition in bulk.

The addition of a controlled amount of water at this stage of the process in combination with the coating of the hot aggregate with hot asphalt is not an obvious step. Heretofore, hot asphalt was mixed with a cold aggregate at the job site. This procedure was very inconvenient and inefficient. The present process enables the composition to be made at the plant and then transported to the job for use.

The present process possesses an inventive concept that is not at all obvious from the prior knowledge and teaching of the art. Heretofore, the addition of water to a mixture of hot asphalt and hot aggregate was evidently avoided for the fear that the latent water would cause a loss of bond between the asphalt and aggregate, and prevent bonding or otherwise adversely affect compaction by rolling upon application as a pad or other surface. However, as taught above, there is no adverse effect. On the contrary, the improved composition as made affords all of the previously discussed advantages and results.

Although the invention has been described by making detailed reference to a preferred method of making such a composition, such detail is to be understood in an instructive rather than in any restrictive sense, many variants being possible within the scope of the claims hereunto appended.

I claim as my invention:

1. The method of making a composition which comprises the steps of:
   (a) mixing hot asphalt with hot aggregate, and
   (b) adding a controlled amount of water to the hot mixture to cool the mixture to a temperature of a hot mix that can be transported and used as a hot mix,
   (c) the water being substantially evaporated by the heat of the mixture.

2. The method of making a composition which comprises the steps of:
   (a) mixing hot asphalt with hot, lightweight aggregate weighing from about two (2) to fifteen (15) lbs. per cubic foot, and
   (b) adding a controlled amount of water to the hot mixture to prevent caking and to cool the de-agglomerated mixture to a temperature of a hot mix that can be transported and used directly in such state,
   (c) the water being substantially evaporated by the heat of the mixture.

3. The method of making a composition which comprises the steps of:
   (a) mixing hot asphalt with hot, lightweight aggregate to provide a resultant mixture having a temperature of about 250 to 350 degrees F., and
   (b) adding a controlled amount of water to the hot mixture to cool the mixture to a temperature of a hot mix that can be transported and used directly in such state,
   (c) the water being substantially evaporated by the heat of the mixture.

4. The method of making a composition which comprises the steps of:
   (a) mixing hot asphalt that is at a temperature of about 350 to 450 degrees F. with hot, lightweight aggregate that is at a temperature of about 100 to 250 degrees F., and
   (b) adding a controlled amount of water to the hot mixture to cool the mixture to a temperature of a hot mix that can be transported and used directly in such state, (c) the water being substantially evaporated by the heat of the mixture.

5. The method of making a composition which comprises the steps of:
   (a) mixing hot asphalt with hot, lightweight aggregate, and
   (b) adding a controlled amount of water to the hot mixture to prevent caking and to cool the de-agglomerated mixture to a hot mix temperature of about 100 to 230 degrees F. so that it can be transported and applied directly in such state,
   (c) the water being substantially evaporated by the heat of the mixture.

6. The method of making a composition which comprises the steps of:
   (a) mixing hot asphalt thta is at a temperature of about 350 to 450 degrees F. with hot, lightweight aggregate weighing from about two (2) to fifteen (15) lbs. per cubic foot which is at a temperature of about 100 to 250 degrees F. to provide a resultant mixture having a temperature of about 250 to 350 degrees F., and
   (b) adding a controlled amount of water to the hot mix to prevent caking and to cool the de-agglomerated mixture to a temperature of about 100 to 230 degrees F. so that it can be transported and applied directly in such state,
   (c) the water being substantially evaporated by the heat of the mixture.

7. The method of making a composition which comprises the steps of:
   (a) mixing about twenty (20) to fifty (50) percent by weight of hot asphalt to about forty (40) to seventy-eight (78) by percent of hot, lightweight aggregate, and
   (b) adding about two (2) to twenty (20) percent by weight of water to prevent caking and to cool the de-agglomerated mixture to a temperature of a hot mix that can be transported and used as a hot mix,
   (c) the water being substantially evaporated by the heat of the mix.

8. The method of making a composition which comprises the steps of:
   (a) mixing about twenty (20) to fifty (50) percent by weight of hot asphalt to about forty (40) to seventy-eight (78) percent by weight of hot, expanded lightweight aggregate as the aggregate comes out of the expanding kiln, the aggregate weighing from about two (2) to fifteen (15) lbs. per cubic foot, and
   (b) adding about two (2) to twenty (20) percent by weight of water to keep caking and to cool the de-agglomerated mixture to a hot mix temperature that can be transported and used directly in such state,
   (c) the water being substantially evaporated by the heat of the mix.

9. The method of making a composition which comprises the steps of:
   (a) mixing about twenty (20) to fifty (50) percent by weight of hot asphalt to about forty (40) to seventy-eight (78) percent by weight of hot, lightweight aggregate to provide a resultant mixture having a temperature of about 250 to 350 degrees F., and
   (b) adding about 2 (2) to twenty (20) percent by weight of water to cool the mixture to a hot mix temperature that can be transported and used directly in such state,
   (c) the water being substantially evaporated by the heat of the mix.

10. The method of making a composition which comprises the steps of:
    (a) mixing about twenty (20) to fifty (50) percent by weight of hot asphalt with about forty (40) to seventy-eight (78) percent by weight of hot, lightweight aggregate, and
    (b) adding about two (2) to twenty (20) percent by weight of water to cool the mixture to a hot mix temperature of about 100 to 230 degrees F. that can be transported and used directly in such state,
    (c) the water being substantially evaporated by the heat of the mix.

11. The method of making a composition which comprises the steps of:
    (a) mixing about twenty (20) to fifty (50) percent by weight of hot asphalt that is at a temperature of about 350 to 450 degrees F. with about forty (40) to seventy-eight (78) percent by weight of hot, lightweight aggregate that is at a temperature of about 100 to 250 degrees F., and
    (b) adding about two (2) to twenty (20) percent by weight of water to cool the mixture to a hot mix temperature that can be transported and used directly in such state,
    (c) the water being substantially evaporated by the heat of the mix.

12. The method of making a composition which comprises the steps of:
    (a) mixing about twenty (20) to fifty (50) percent by weight of hot asphalt that is at a temperature of about 350 to 450 degrees F. with about forty (40) to seventy-eight (78) percent by weight of hot, lightweight aggregate that is at a temperature of about 100 to 250 degrees F., and
    (b) adding about two (2) to twenty (20) percent by weight of water to the mixture to prevent caking and to cool the hot de-agglomerated mixture to a hot mix temperature of about 100 to 230 degrees F. so that it can be transported and applied directly in such state,
    (c) the water being substantially evaporated by the heat of the mix.

References Cited
UNITED STATES PATENTS

| | | | |
|---|---|---|---|
| 1,894,630 | 1/1933 | Neuberger | 106—280 |
| 2,009,886 | 7/1935 | Heghinian | 106—281 |
| 2,625,512 | 1/1953 | Powell | 106—281 |
| 2,824,022 | 2/1958 | Sucetti | 106—281 |
| 3,249,452 | 5/1966 | Plumb | 106—281 |
| 2,281,505 | 4/1942 | Kirkland | 106—281 |
| 2,572,068 | 10/1951 | Sommer | 117—100 |

JULIUS FROME, *Primary Examiner.*

J. B. EVANS, *Assistant Examiner.*